United States Patent
Distel et al.

(10) Patent No.: US 10,845,642 B2
(45) Date of Patent: Nov. 24, 2020

(54) SYSTEM AND METHOD FOR SELECTIVE ACTIVATION OF DISPLAY BACKLIGHT ILLUMINATION

(71) Applicant: Visteon Global Technologies, Inc., Van Buren Township, MI (US)

(72) Inventors: Arno Distel, Karlsruhe (DE); Roman Bickel, Karlsruhe (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/907,794

(22) Filed: Feb. 28, 2018

(65) Prior Publication Data

US 2019/0265545 A1  Aug. 29, 2019

(51) Int. Cl.
*G02F 1/1335* (2006.01)
*H05B 33/08* (2020.01)
*G02F 1/13357* (2006.01)
*H05B 45/10* (2020.01)
*H05B 45/48* (2020.01)

(52) U.S. Cl.
CPC ....... *G02F 1/133603* (2013.01); *H05B 45/10* (2020.01); *H05B 45/48* (2020.01); *G02F 2001/133613* (2013.01)

(58) Field of Classification Search
CPC .................................................. G09G 3/3413
See application file for complete search history.

(56) References Cited

U.S. PATENT DOCUMENTS 8,077,137 B2 * 12/2011 Lee ...................... G09G 3/3413
                                                                345/102

* cited by examiner

*Primary Examiner* — Joseph L Williams
(74) *Attorney, Agent, or Firm* — Quinn IP Law

(57) ABSTRACT

A system and method for the selective illumination of a display backlight, the system including a plurality of light sources configured in an array, a plurality of switches electrically connected to the plurality of light sources, and at least one substrate configured to receive the plurality of light sources and the plurality of switches, wherein the plurality of switches are configured to operate at least a portion of the plurality of light sources based upon a control signal, and wherein the at least one substrate includes a power supply connection.

15 Claims, 7 Drawing Sheets

SYSTEM AND METHOD FOR SELECTIVE ACTIVATION OF DISPLAY BACKLIGHT ILLUMINATION

BACKGROUND

Video displays, such as liquid crystal displays (LCDs), typically use backlight illumination in order to display images. In many situations, the source of LCD backlight illumination is light emitting diodes (LEDs). Backlight LEDs may also be used to provide enhanced color and visual contrast of LCDs and other video displays. Backlight LEDs may be arranged at the bottom of a video display, around the perimeter of the video display, or behind the video display, for example. When all of the backlight LEDs are illuminated, the video display appearance and performance are enhanced—that is, the images displayed on the entire video display are clearly visible to a viewer of the video display. In situations where some or all of the backlight LEDs are dimmed, or not activated, the images displayed on the video display may be less visible, or not visible at all.

While backlight LEDs are relatively energy-efficient, they still consume energy, and there are situations where dimming some or all of the backlight LEDs may be desirable. In one situation, that of a video display in a mobile device (e.g., smart phone), it may be desirable to dim (or selectively activate) some of the backlight LEDs to conserve battery power. For example, most of the backlight LEDs of the mobile device video display may be dimmed when the mobile device is in stand-by or "sleep" mode, in order to preserve (or extend) battery life of the mobile device. In another situation, that of a video display in a vehicle, a portion of a video display (such as in an instrument panel) may be dimmed in order to conserve the energy of the vehicle battery. This situation can be particularly desirable when the vehicle is battery-powered. In yet another situation, that of a video display of a television, a portion of the television video display may be dimmed depending upon the operational status of the television, in order to conserve energy.

What is needed is a system and method of selective activation of display backlight illumination.

SUMMARY

One aspect of the present disclosure relates to a system for the selective activation of a display backlight, the system including a plurality of light sources configured in an array, a plurality of switches electrically connected to the plurality of light sources, and at least one substrate(s) configured to receive the plurality of light sources and/or the plurality of switches, wherein the plurality of switches are configured to activate at least a portion of the plurality of light sources based upon a control signal, and wherein the substrate includes a power supply connection.

The system may also include a plurality of light sources that may be light emitting diodes (LEDs).

The system may include a plurality of light sources that may be configured in at least a first portion of light sources and a second portion of light sources.

The system may include a first portion of light sources that may be electrically connected to a first portion of the plurality of switches.

The system may include a first portion of light sources that may be configured in parallel.

The system may include a second portion of light sources that may be configured in parallel.

The system may include a plurality of switches that may be configured on the substrate to be selectively and/or individually activated.

The system may include a plurality of switches that are configured to electrically connect a plurality of electrical potentials to allow current flow, wherein the plurality of switches are solid-state (e.g., transistor), and/or mechanical switches.

The system may include a plurality of switches that may be configured on the substrate to be selectively activated in at least a first portion of the plurality of switches and a second portion of the plurality of switches.

The system may include a substrate that may be a flexible printed circuit (FPC).

The system may include at least one substrate that may be a printed circuit board (PCB).

The system may include at least one substrate that may be configured to be connected to a power supply.

The system may include at least one substrate that may be configured to be connected to a control system.

The system may include at least one cable, (e.g., zero insert force (ZIF) cable), to interconnect at least a first substrate and a second substrate.

Another aspect of the present disclosure related to a method for the selective activation of a display backlight, the method including arranging a plurality of light emitting diodes (LEDs) in an array to form a backlight, selectively connecting the plurality of LEDs to a plurality of switches, electrically connecting the plurality of LEDs and the plurality of switches using at least one substrate, connecting the at least one substrate to a power supply, and using a controller, selectively activating at least a first portion of the plurality of LEDs using at least a first portion of the plurality of switches.

The method may include arranging of the plurality of LEDs in parallel.

The method may include selectively activating a second portion of the plurality of LEDs using at least a second portion of the plurality of switches.

The method may include activating the first portion of the plurality of LEDs in a first operating mode and activating the second portion of the plurality of LEDs is in a second operating mode.

The method may include a first operating mode that may be distinct from the second operating mode.

The method may include using the controller, the second portion of the plurality of LEDs may be selectively activated using at least a second portion of the plurality of switches.

The method may include at least one substrate electrically connecting the plurality of LEDs and the plurality of switches that may be a flexible printed circuit (FPC).

The method may include one or more cables (e.g., a zero-input-force cable (ZIF)), that may interconnect the at least one substrate.

In another aspect, a display backlight may include a plurality of light emitting diodes (LEDs) configured in an array for a display backlight, a plurality of switches electrically connected to the LEDs for the display backlight, at least one substrate of the display backlight configured to receive the plurality of LEDs and the plurality of switches, wherein the plurality of switches are configured to selectively activate at least a portion of the plurality of LEDs of the display backlight based upon a control signal, and wherein the at least one substrate includes a power supply connection, and wherein the plurality of LEDs, plurality of switches, and the at least one substrate are configured with the display backlight, the display backlight including a control system for the selective activation of at least the portion of the plurality of LEDs based at least upon the control signal.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION

Figure 1:
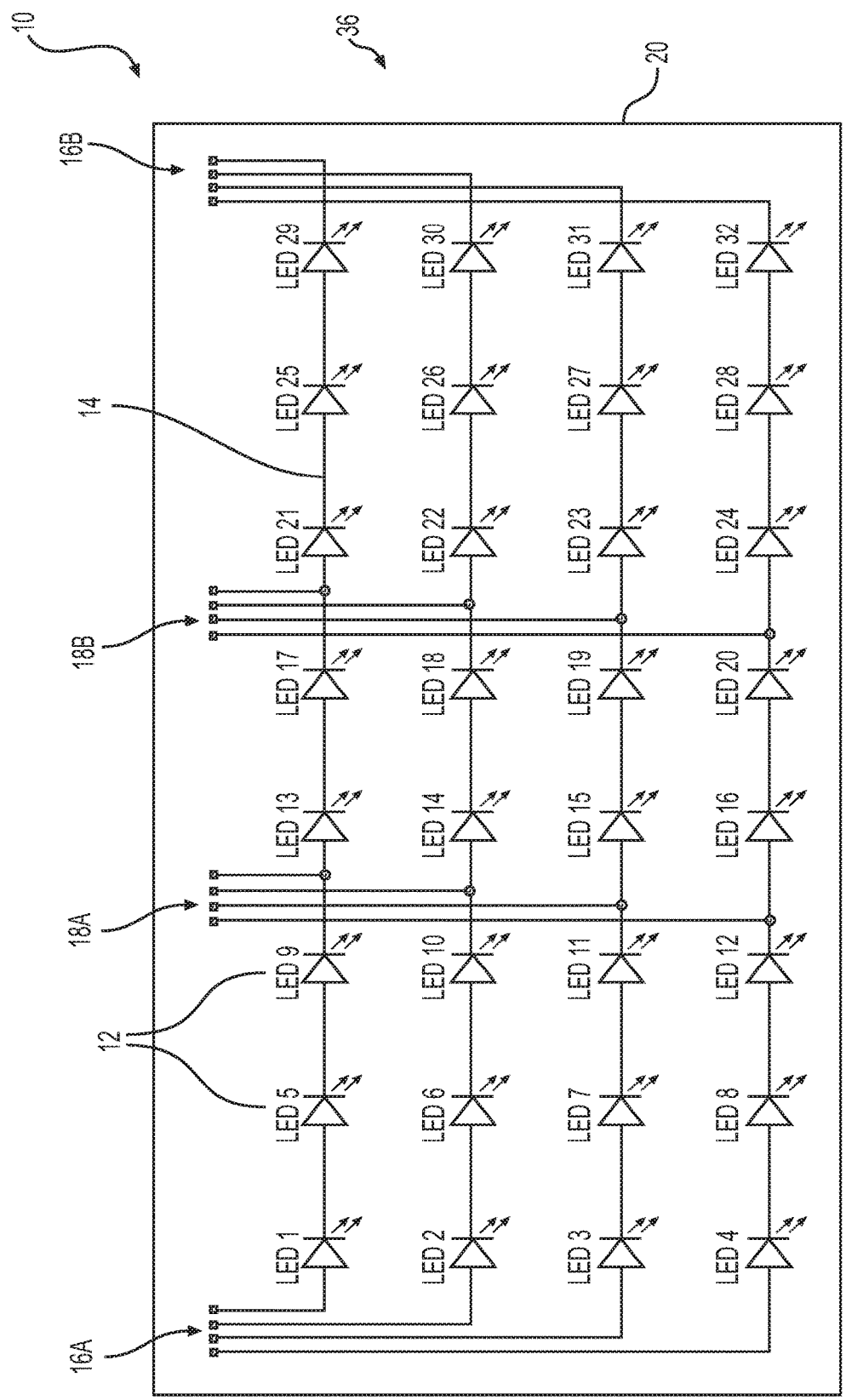
FIG. 1 is a diagram of a plurality of LEDs disposed on at least one substrate, according to embodiments of the disclosure.

Referring to the Figures, like numerals indicate corresponding parts throughout the several views, a LED backlight 36 is shown in FIG. 1. System 10 includes a plurality of LEDs 12 (though other light sources are contemplated), connected to each other by wires (i.e., leads), 14 forming an array of LEDs 12 (numbered LED1-LED32 in FIGS. 1-4) on at least one substrate (e.g., flexible printed circuit (FPC)), 20. It should be understood that one substrate 20 may be interconnected to at least one other substrate 20 by a cable (e.g., zero-input-force (ZIF) cable or other suitable electrical connecting device). At either end of the array of LEDs 12, terminal connectors 16A, 16B are disposed from substrate 20, through which electrical power may be conducted to the array of LEDs 12. For example, current may flow from terminal connector 16A (i.e., positive) through the array of LEDs 12 to terminal connector 16B, completing an electrical circuit and resulting in the illumination of the array of the LEDs 12.

In an embodiment, intermediate connectors 18A, 18B may be disposed from at least one substrate 20 in between terminal connectors 16A, 16B, joined to a portion of the array of LEDs 12 by wires 14. As shown in FIG. 1, intermediate connector 18A is disposed from substrate 20 between LED9-LED13, LED10-LED14, LED11-LED15, and LED12-LED16. Intermediate connector 18A allows for a portion of the array of LEDs 12 to be isolated for selective activation of backlight 36. In this embodiment, LED13-LED32 may be isolated from LED1-LED12 on substrate 20 such that current flowing from terminal connector 16A to intermediate connector 18A results in the selective illumination L of LED1-LED12, while LED13-LED32 are selectively dimmed (i.e., not illuminated). Thus, LCD 30 utilizing system 10 with backlight 36 operated according to this embodiment provides a portion 32A of LCD 30 selectively illuminated by LED1-LED12.

In another embodiment, intermediate connector 18B is disposed from at least one substrate 20 between LED17-LED21, LED18-LED22, LED19-LED23, and LED20-LED24. Intermediate connector 18B allows for another portion of the array of LEDs 12 to be isolated for selective activation of backlight 36. In this embodiment, LED21-LED32 may be isolated from LED1-LED20 on substrate 20 such that current flowing from terminal connector 16A to intermediate connector 18B results in the selective illumination L of LED1-LED20, while LED21-LED32 are selectively dimmed. Thus, LCD 30 utilizing system 10 with backlight 36 operated according to this embodiment provides to a viewer portions 32A, 32B of LCD 30 that is selectively illuminated by LED1-LED20.

In another embodiment, intermediate connector 18A is disposed from at least one substrate 20 between LED9-LED13, LED10-LED14, LED11-LED15, and LED12-LED16. Intermediate connector 18A allows for another portion of the array of LEDs 12 to be isolated for selective activation with backlight 36. In this embodiment, LED1-LED12 may be isolated from LED13-LED32 on substrate 20 such that current flowing from intermediate connector 18A to terminal connector 16B results in the selective illumination L of LED13-LED32 illuminating, while LED1-LED12 are selectively dimmed. Thus, LCD 30 utilizing system 10 with backlight 36 operated according to this embodiment provides to a viewer portions 32B, 32C of LCD 30 selectively illuminated by LED13-LED32.

In another embodiment, intermediate connector 18B is disposed from at least one substrate 20 between LED17-LED21, LED18-LED22, LED19-LED23, and LED20-LED24. Intermediate connector 18A allows for another portion of the array of LEDs 12 to be isolated for selective activation of backlight 36. In this embodiment, LED1-LED20 may be isolated from LED21-LED32 on substrate 20 such that current flowing from intermediate connector 18B to terminal connector 16B results in the selective illumination L of LED21-LED32, while LED1-LED20 are selectively dimmed. Thus, LCD 30 utilizing system 10 with backlight 36 operated according to this embodiment provides to a viewer a portion 32C of LCD 30 selectively illuminated by LED13-LED32.

In another embodiment, terminal connector 16A is disposed from at least one substrate 20 connected to LED1-LED4 and intermediate connector 18A is disposed from substrate 20 between LED9-LED13, LED10-LED14, LED11-LED15, and LED12-LED16. Intermediate connector 18B is disposed from substrate 20 between LED17-LED21, LED18-LED22, LED19-LED23, and LED20-LED24 and terminal connector 16B is disposed from substrate 20 connected to LED29-LED32. In this embodiment, LED13-LED20 may be isolated from LED1-LED12 and LED21-LED32 on substrate 20 such that current flowing from terminal connector 16A to intermediate connector 18A and from intermediate connector 18B to terminal connector 16B results in the selective illumination L of LED1-LED12 and LED21-LED3, while LED13-LED20 are selectively dimmed. Thus, LCD 30 utilizing system 10 with backlight 36 operated according to this embodiments provides to a viewer portions 32A, 32C of LCD 30 selectively illuminated by LED13-LED32.

In another embodiment, intermediate connector 18A is disposed from at least one substrate 20 between LED9-LED13, LED10-LED14, LED11-LED15, and LED12-LED16. Intermediate connector 18B is disposed from substrate 20 between LED17-LED21, LED18-LED22, LED19-LED23, and LED20-LED24. Intermediate connectors 18A, 18B allow for two portions of the array of LEDs 12 to be isolated in system 10 with backlight 36. In this example, LED1-LED12 and LED21-LED32 may be isolated from LED13-LED17 on substrate 20 such that current flowing from intermediate connector 18A to intermediate connector 18B results in the selective illumination L of LED13-LED20, while LED1-LED12 and LED21-LED32 are selectively dimmed. Thus, LCD 30 utilizing system 10 with backlight 36 operated according to this embodiment provides to a viewer portion 32B of LCD 30 selectively illuminated by LED13-LED32.

Figure 2:
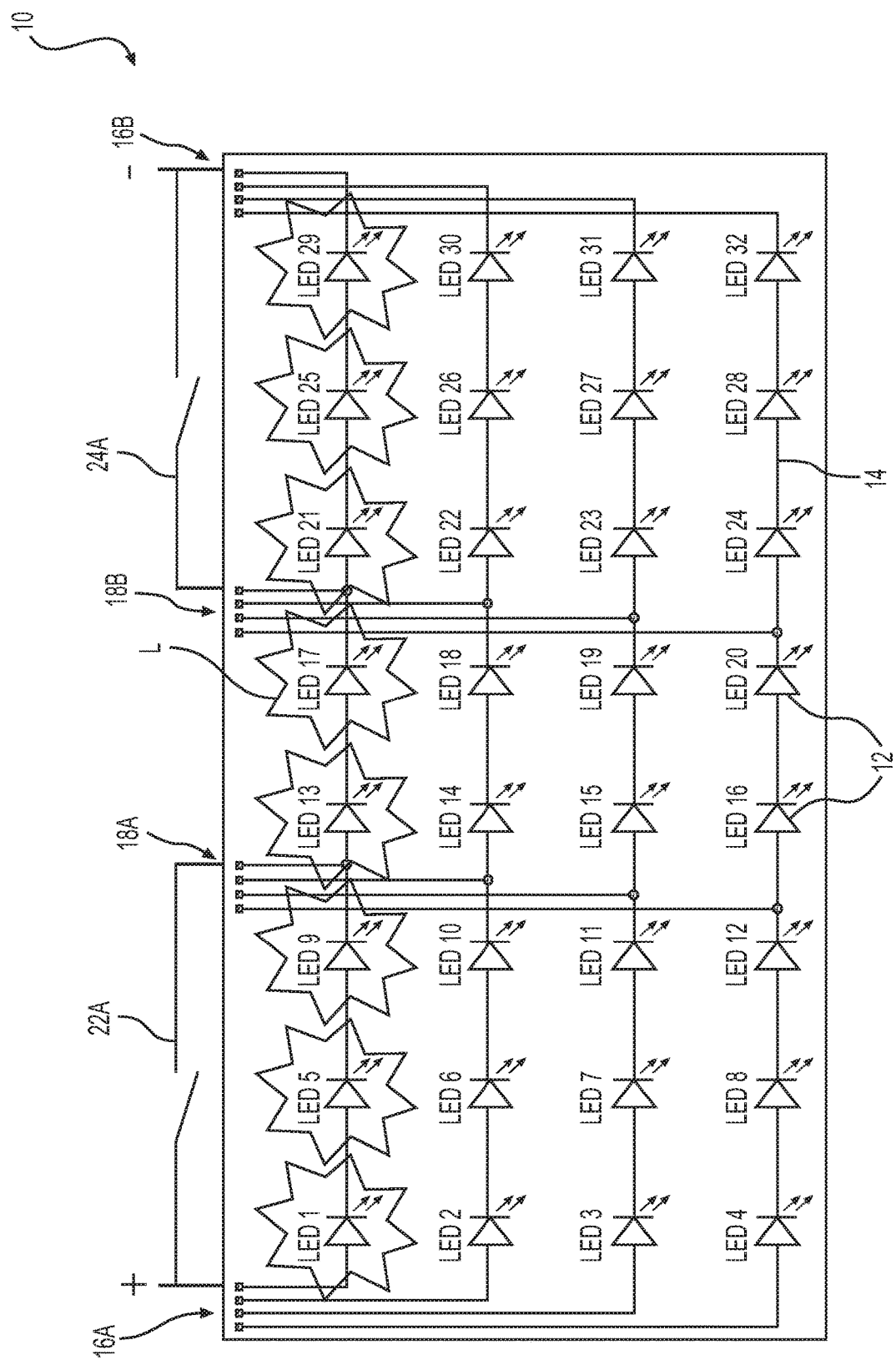
FIG. 2 is a diagram of the plurality of LEDs connected to a pair of switches in the open position with LED1, LED5, LED9, LED13, LED17, LED21, LED25, and LED29 illuminated, according to embodiments of the disclosure.

Referring now to FIG. 2, switch 22A is shown in the open position connected to terminal connector 16A and intermediate connector 18A. Switch 24A is shown in the open position connected to intermediate connector 18B and terminal connector 16B on substrate (e.g., FCP), 20 of backlight 36 of system 10. In this example, current is applied to the anode of LED1, one of terminal connectors 16A. A current sink (i.e., ground) is applied to the cathode of LED29, completing the circuit between LED1 and LED29 and selectively illuminating (as indicated by "L") LED1, LED5, LED9, LED13, LED17, LED21, LED25, and LED29. As current is not applied to the anodes of LED2, LED3, and LED4 via terminal connectors 16A, rows of LED12 (namely, row LED2-LED30, row LED3-LED31, and row LED4-LED32) are not illuminated (i.e., that portion of the LED backlight is dimmed, the portion of LCD 30 backlit by LED2-LED32 is not visible to a viewer, and the energy required to illuminate LED2-LED32 is therefore conserved.

Figure 3:
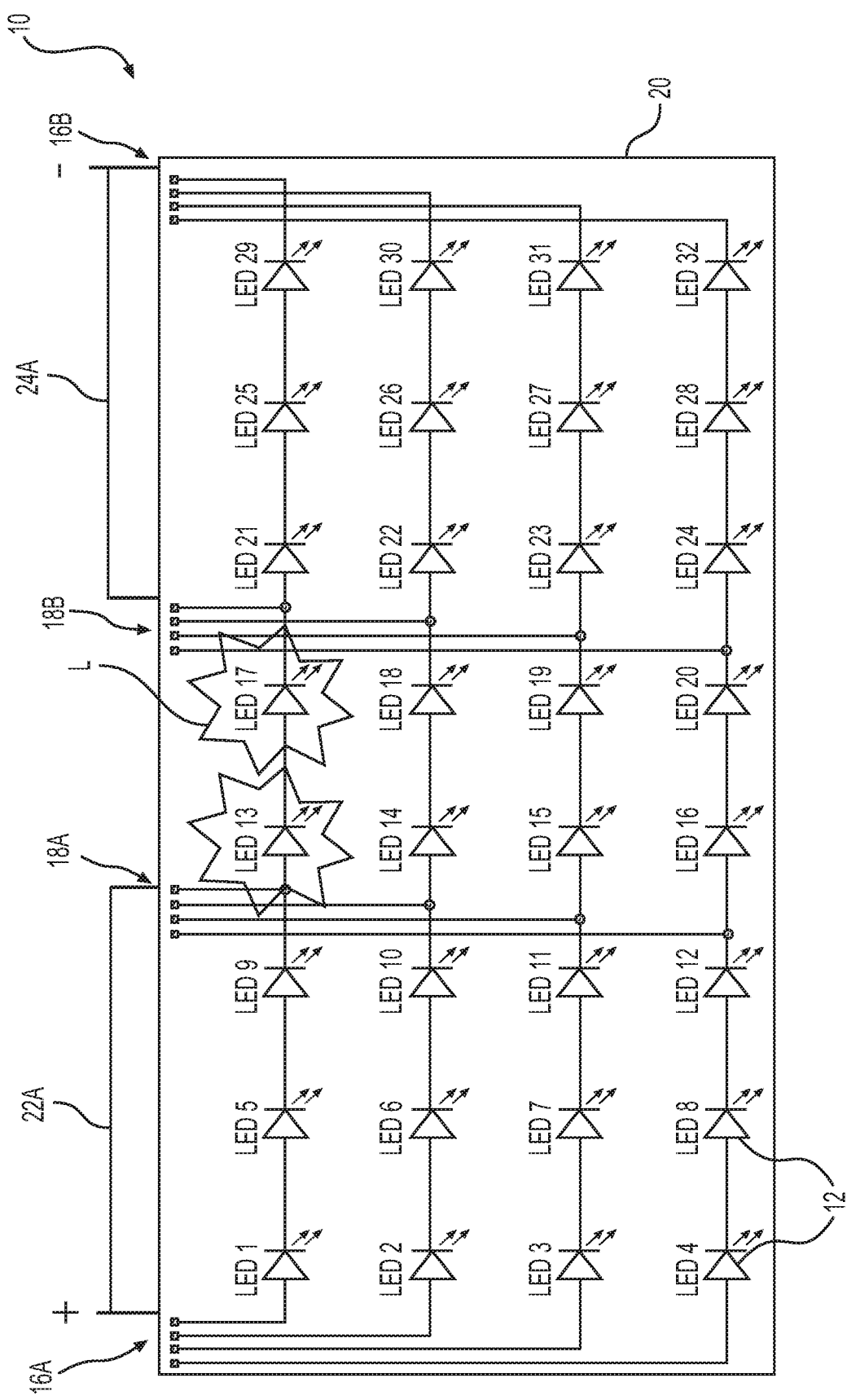
FIG. 3 is a diagram of the plurality of LEDs as shown in FIG. 2, connected to the pair of switches in the closed position wherein only LED13 and LED17 are illuminated, according to embodiments of the disclosure.

FIG. 3 illustrates the embodiment of the system 10 shown in FIG. 2, except in FIG. 3, switch 22A is shown in the closed position connected to terminal connector 16A and intermediate connector 18A. Switch 24A is also now shown in the closed position connected to intermediate connector 18B and terminal connector 16B on substrate 20 of backlight 36 of system 10. As a result of the closed switches 22A, 24A, when current is applied to the anode of LED1, there is a short between LED1 and LED9 and current bypasses LED1-LED5-LED9. As a result, LED1, LED5, and LED9 are not illuminated (i.e., dimmed). However, because of the short between the anode of LED1 and cathode of LED9, current instead flows via closed switch 22A to the anode of LED13 and LED17, causing both LEDs 12 to illuminate. Similarly to the configuration of switch 22A and LED1, LED5, and LED9, due to the short caused by the closed switch 24A, current flows from the cathode of LED17 through closed switch 22A to terminal connector 16B, bypassing LED21, LED25, and LED29. LED21, LED25, and LED29 therefore do not illuminate due to the short caused by closed switch 24A. In the example shown in FIG. 3, because LED13 and LED17 are selectively illuminated, 75% of the energy that would be required to illuminate LED1, LED5, LED9, LED13, LED17, LED21, LED25, and LED29 is conserved by the selective illumination of LED13 and LED17.

Figure 4:
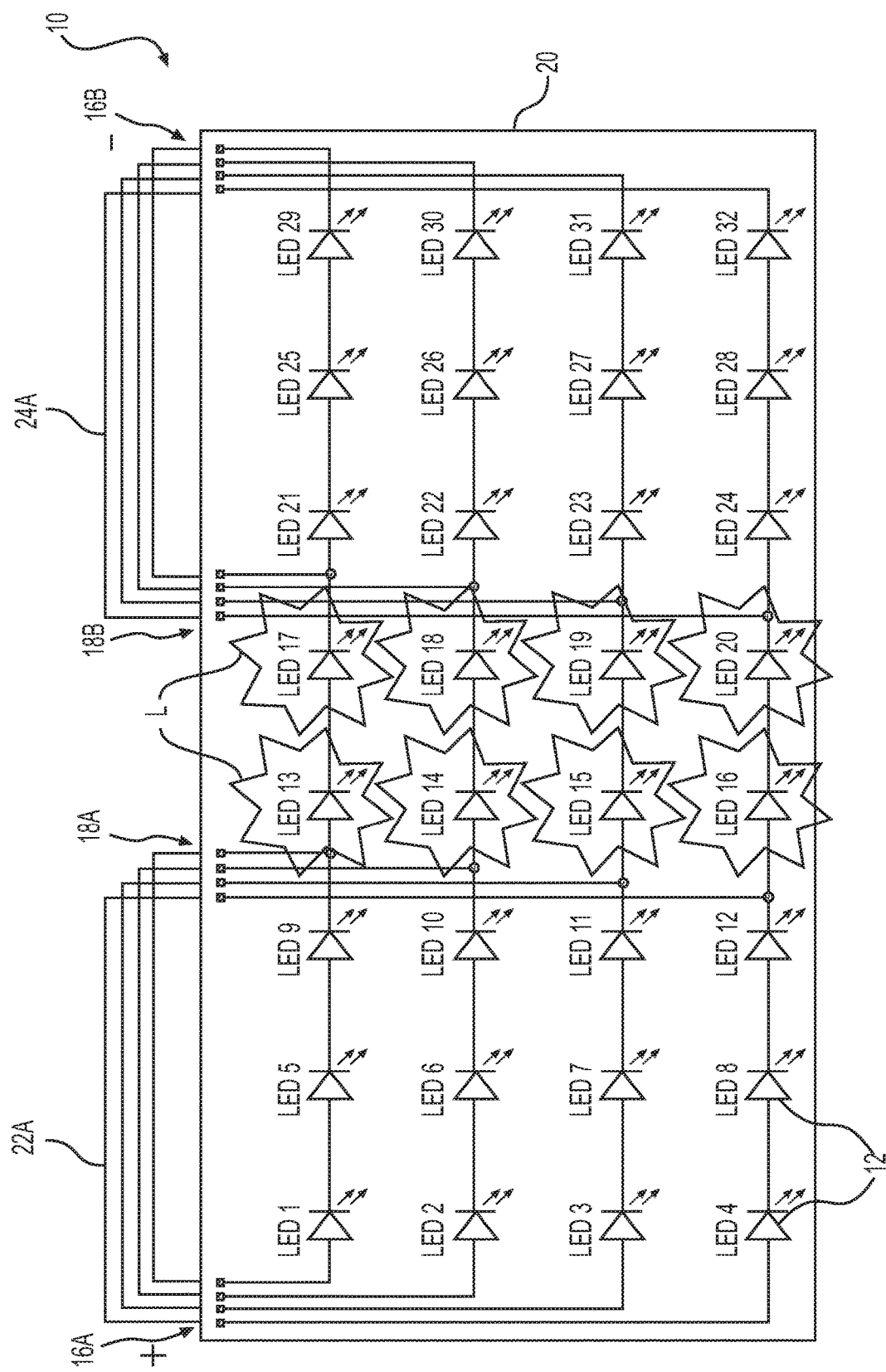
FIG. 4 is a diagram the plurality of LEDs as shown in FIG. 2, connected to a plurality of switches wherein LED13-LED20 are illuminated, according to embodiments of the disclosure.

Referring now to FIG. 4, the configuration described in the paragraph above is repeated, and expanded upon for the second through 4 rows of LEDs 12. Switches 22A-22D are shown in the closed position connected to terminal connector 16A and intermediate connector 18A. Switches 24A-24D are also now shown in the closed position connected to intermediate connector 18B and terminal connector 16B on substrate (e.g., FPC) 20 of backlight 36 of system 10. As a result of the closed switches 22A-22D, 24A-24D, current is applied to the anodes of LED1-LED4 and a short occurs between LED1 and LED9; LED2 and LED10; LED3 and LED11; and LED4 and LED12. Current bypasses LED1-LED5-LED9, LED2-LED6-LED10, LED3-LED7-LED11, and LED4-LED8-LED10. Consequently, LED1-LED5-LED9, LED2-LED6-LED10, LED3-LED7-LED11, and LED4-LED8-LED10 are not illuminated (i.e., dimmed).

Due to the shorts between the anode of LED1 and cathode of LED9, anode of LED2 and cathode of LED10, anode of LED3 and cathode of LED11, and anode of LED4 and cathode of LED12, current instead flows via closed switches 22A-22D to the anode of LED13 and cathode of LED17, anode of LED14 and cathode of LED18, anode of LED15 and cathode of LED19, and anode of LED16 and cathode of LED20, respectively, causing LED13-LED20 to selectively illuminate. Similarly to the configuration of switches 22A-22D and LED1-LED9, LED2-LED10, LED3-LED11, and LED4-LED12, due to the shorts caused by the closed switches 24A-24D, current flows from the cathodes of LED17-LED20 through closed switches 24A-24D to terminal connector 16B, bypassing LED21-LED32. As a result, LED21-LED32 do not illuminate (are selectively dimmed) due to the shorts caused by switches 24A-24D.

Figure 5:
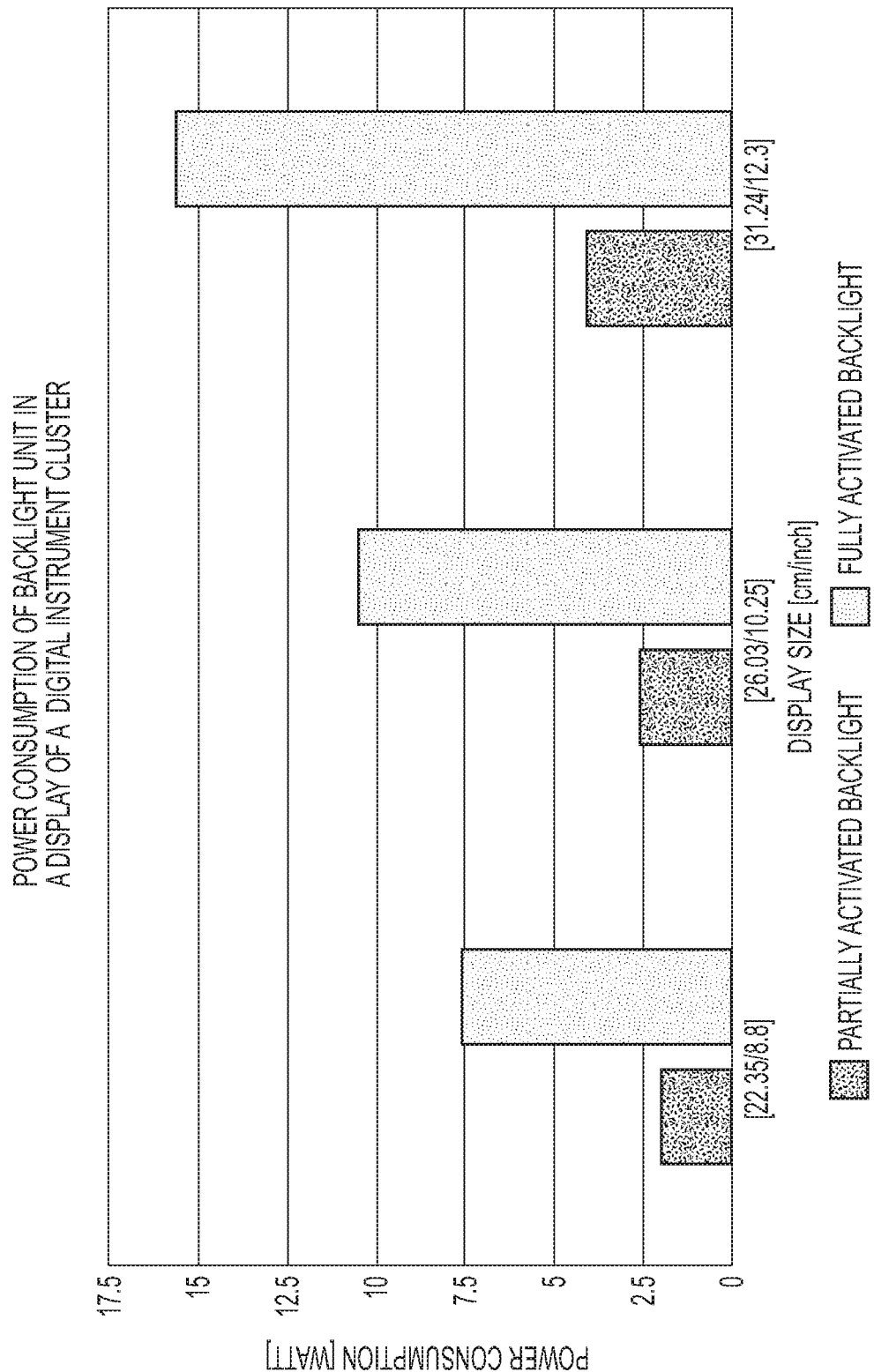
FIG. 5 is a chart describing exemplary energy consumption of a LCD display with full backlight operation and selective activation, according to embodiments of the disclosure.

FIG. 5 is an exemplary chart detailing energy conservation that may be achieved by one or more embodiments of system 10 in a display application of digital instrument cluster in automotive environment. Referring to first set of columns, from left to right, a 22.35 cm (8.8 inch) display, using the system 10 consumed only about 2 W of power for a partially dimmed backlight 36, compared to about 7.5 W of power for a maximum (i.e., full illumination), backlight power setting. At a bigger display size of 26.03 cm (10.25 inch), the system 10 only consumed about 2.5 W of power compared to almost 11 W for a maximum backlight power setting. At a 31.24 cm (12.3 inch) display setup, a power consumption of the system 10 was measured at about 4 W with partially activated backlight, whereas the full operated backlight consumed over 15 W.

Figure 6:
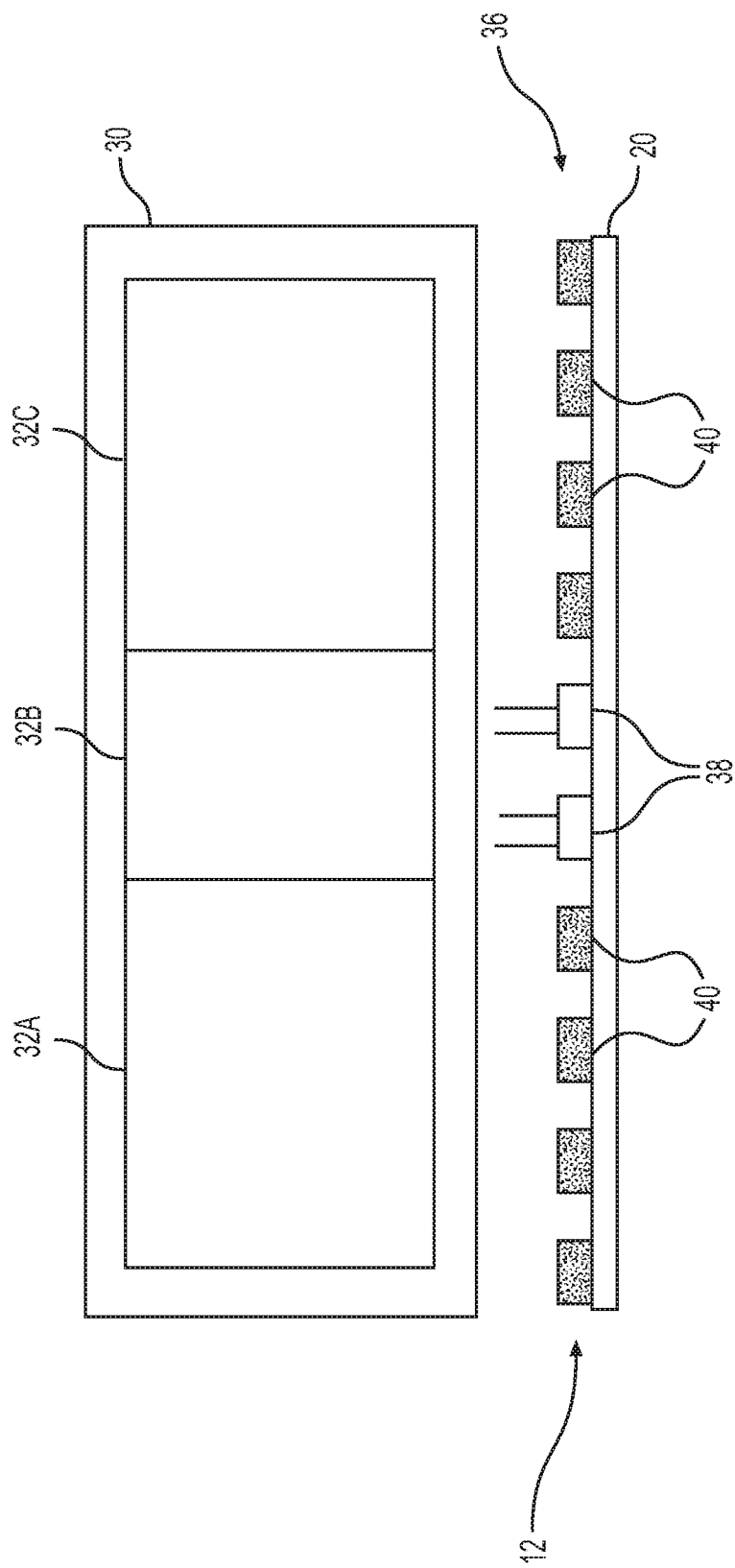
FIG. 6 is a block diagram of a LCD with a backlight selectively activated, according to embodiments of the disclosure.

Referring now to FIG. 6, LCD 30 is shown divided into three display sections 32A-32C. Positioned beneath LCD 30 in this embodiment is backlight 36. It should be understood that backlight 36 may be positioned elsewhere relative to LCD 30, such as, but not limited to, above, left, right, behind, or a combination thereof. The example provided is therefore for illustrative purposes and not limiting. Backlight 36 may include a number of LEDs 12 disposed on at least one substrate 20 (e.g., flexible printed circuit (FPC) or other suitable holder for LEDs 12). Backlight 36, in this embodiment, includes a plurality of LEDs 12, including illuminated LEDs 38 (emitting light L) and dimmed LEDs 40 (not emitting light L). Illuminated LEDs 38 and dimmed LEDs 40 may be as described above, configured according to system 10 (see FIGS. 3-4). When selectively activated according to system 10, illuminated LEDs 38 emit light L and permit display section 32B of LCD 30 to be visible to a viewer (e.g., user). Additionally, when dimmed according to system 10, dimmed LEDs 40 prevent display sections 32A, 32C from being visible to the viewer. This configuration according to embodiments of system 10, consumes only 25% of the power that would be required to illuminate all three sections 32A-32C of LCD 30.

Utilizing system 10 to conserve power by selectively activating (or partially dimming) backlight 36 for LCD 30 has many applications. In a first embodiment, system 10 can be utilized in a LCD television. For example, at times portions of the LCD television may not be required to be illuminated (i.e., there is nothing to see displayed on those portions), such as for movies that are of a certain format (i.e., letterbox). As a result, energy is being consumed to backlight illuminate what is essentially a black screen or "dead" area of the display. The LCD television, when equipped with system 10 and operational programming, can selectively activate (or partially dim) the LEDs 12 of backlight 36 such that the dead area of the screen is not illuminated, and energy can therefore be conserved.

In a second embodiment, system 10 can be utilized in the LCD of a mobile device (i.e., smart phone). As described above, there are situations and/or applications that do not utilize all of the space of the LCD of the mobile device, yet the entire backlight 36 is illuminated and consuming battery power unnecessarily. Equipping the mobile device backlight 36 with system 10 enables the mobile device, via programming, to partially illuminate the mobile device backlight 36 and thus conserve battery power and prolong battery life.

Figure 7:
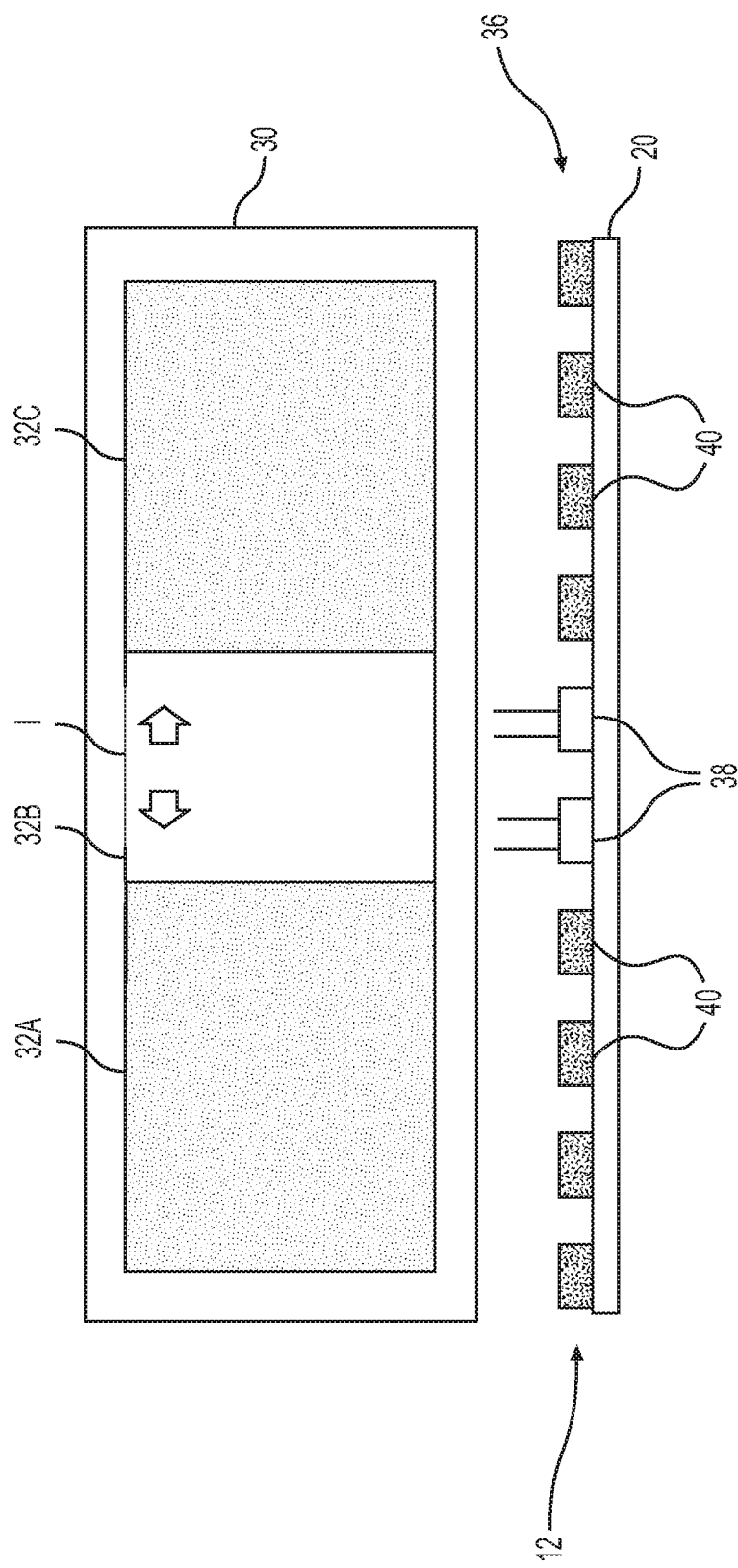
FIG. 7 is a block diagram of the LCD with backlight as shown in FIG. 5, selectively activated, with the center portion of the LCD illuminated and the right and left portions of the LCD dimmed, according to embodiments of the disclosure.

In a third embodiment, system 10 can be utilized in a LCD vehicle instrument panel (IP). Some or all of the IP (or other LCD in the vehicle—navigation, entertainment) can be equipped with system 10 and programming to operate system 10. In operation, system 10 can selectively activate (partially dim) some or all of the LCD vehicle IP backlight. This is particularly desirable in a number of situations. For example, when the vehicle is disabled (i.e., inoperative) but located on or near a roadway, the driver of the vehicle may wish to activate the vehicle's hazard lights or flashers. As the vehicle is inoperative, the viewable remainder of the vehicle IP may not be of much interest to the driver, but an indicator I on the vehicle IP (i.e., flashing arrows, as shown in FIG. 7) is desired and may be a requirement of national or international vehicle safety standards. However, if the entire vehicle IP is illuminated when the vehicle is inoperative, the power consumption of the vehicle IP has the potential to deplete the vehicle battery. This may result in a no-start situation or, in the case of an entirely electric vehicle, may dramatically reduce the range of the vehicle once the hazard situation is resolved. By equipping the vehicle IP backlight 36 with system 10 and programming the vehicle or its systems to utilize system 10, the vehicle IP backlight 36 can be selectively activated (or partially dimmed), greatly (as described above) conserving electric power of the vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle digital instrument cluster display comprising:
    a liquid crystal display (LCD) configured to display images;
    a backlight cooperating with the LCD to illuminate the LCD, the backlight including:
        an array of light emitting diodes (LEDs) having at least a first portion of LEDs and a second portion of LEDs,
        a plurality of switches electrically connected to the array of LEDs, wherein the plurality of switches includes a first portion of switches electrically connected to the first portion of LEDs and a second portion of switches electrically connected to the second portion of LEDs, and
        at least one substrate configured to receive the first portion of LEDs and the second portion of LEDs; and
    a system for illuminating the array of LEDs of the backlight,
    wherein the plurality of switches are configured to be individually activated to conserve power consumption of the backlight by selectively illuminating at least a portion of the array of LEDs, and
    wherein the system transmits a control signal to the plurality of switches to activate and selectively illuminate at least a portion of the array of LEDs to illuminate one or more sections of the LCD with the backlight.

2. The display of claim 1, wherein the first portion of LEDs are configured in parallel.

3. The display of claim 1, wherein the second portion of LEDs are configured in parallel.

4. The display of claim 1, wherein the plurality of switches are configured to electrically connect a plurality of electrical potentials to allow current flow, wherein the plurality of switches are solid-state and/or mechanical switches.

5. The display of claim 1, wherein the plurality of switches are configured on the at least one substrate to be selectively activated in at least the first portion of the plurality of switches and the second portion of the plurality of switches.

6. The display of claim 1, wherein the at least one substrate is a flexible printed circuit (FPC).

7. The display of claim 1, wherein the at least one substrate is a printed circuit board (PCB).

8. The display of claim 1, wherein the at least one substrate is configured to be connected to a power supply.

9. The display of claim 1 further comprising at least one cable, to interconnect at least a first substrate and a second substrate.

10. The display of claim 1, wherein LCD further comprises one or more display sections that are selectively illuminated by the backlight to conserve power consumption of the display.

11. A backlight for use in combination with a liquid crystal display (LCD) displaying images for a vehicle digital instrument cluster display comprising:
    a plurality of light emitting diodes (LEDs) configured in an array for the backlight, wherein the plurality of LEDs includes at least a first portion of LEDs and a second portion of LEDs;
    a plurality of switches electrically connected to the plurality of LEDs for the backlight, wherein the plurality of switches include a first portion of switches electrically connected to the first portion of LEDs and a second portion of switches electrically connected to the second portion of LEDs;
    at least one substrate of the backlight configured to receive the plurality of LEDs and the plurality of switches; and
    a system for illuminating the plurality of LEDs,
    wherein the plurality of switches are configured to be individually activated to conserve power consumption of the backlight by selectively illuminating at least a portion of the plurality of LEDs, wherein the system transmits a control signal to the plurality of switches to activate and selectively illuminate at least a portion of the plurality of LEDs to illuminate one or more sections of the LCD with the backlight.

12. The backlight of claim 11, wherein the first portion of LEDs are configured in parallel.

13. The backlight of claim 11, wherein the second portion of LEDs are configured in parallel.

14. The backlight of claim 11, wherein the plurality of switches are configured to electrically connect a plurality of electrical potentials to allow current flow, wherein the plurality of switches are solid-state and/or mechanical switches.

15. The backlight of claim 11, wherein the plurality of switches are configured on the at least one substrate to be selectively activated in at least the first portion of the plurality of switches and the second portion of the plurality of switches.

* * * * *